United States Patent [19]

Ragosta

[11] Patent Number: 5,552,056
[45] Date of Patent: Sep. 3, 1996

[54] FILTER ELEMENT HAVING AN ION EXCHANGE YARN WINDING LAYER

[75] Inventor: Joseph M. Ragosta, Elkton, Md.

[73] Assignee: Graver Chemical Company, Glasgow, Del.

[21] Appl. No.: 374,046

[22] Filed: Jan. 17, 1995

[51] Int. Cl.⁶ .................. C02F 1/42; B01D 27/06
[52] U.S. Cl. .................. 210/660; 210/679; 210/777; 210/266; 210/193; 210/323.2; 210/497.1; 210/437; 210/502.1; 210/503
[58] Field of Search .................. 210/497.1, 503, 210/502.1, 323.2, 288, 193, 688, 679, 777, 282, 266, 660, 663, 437

[56] References Cited

U.S. PATENT DOCUMENTS

| 2,933,460 | 4/1960 | Richter et al. | 260/2.1 |
| 3,055,729 | 9/1962 | Richter et al. | 260/2.1 |
| 3,692,186 | 9/1972 | Marzocchi | 210/494 |
| 4,058,456 | 11/1977 | Head | 427/244 |
| 4,200,735 | 4/1980 | Sano et al. | 536/30 |
| 4,269,707 | 5/1981 | Butterworth et al. | 210/777 |
| 4,313,832 | 2/1982 | Shimizu et al. | 210/663 |
| 4,414,113 | 11/1983 | LaTerra | 210/636 |
| 4,500,430 | 2/1985 | Dasgupta | 210/638 |
| 4,700,723 | 10/1987 | Yoshikawa et al. | 131/334 |
| 4,780,213 | 10/1988 | Ogletree | 210/679 |
| 4,786,527 | 11/1988 | Fejes et al. | 427/244 |
| 4,988,364 | 1/1991 | Perusich et al. | 210/679 |
| 5,024,767 | 6/1991 | Kubo et al. | 210/682 |
| 5,133,864 | 7/1992 | Vaughn et al. | 210/437 |
| 5,192,446 | 3/1993 | Salem et al. | 210/685 |
| 5,314,922 | 5/1994 | Takai | 521/33 |
| 5,334,451 | 8/1994 | Barboza | 428/377 |
| 5,346,624 | 9/1994 | Libutti et al. | 210/679 |
| 5,346,924 | 9/1994 | Giuffrida | 521/28 |
| 5,376,278 | 12/1994 | Salem | 210/679 |
| 5,407,582 | 4/1995 | Poschmann et al. | 210/669 |

FOREIGN PATENT DOCUMENTS 61-167404  1/1985  Japan .

Primary Examiner—Cynthia L. Nessler
Attorney, Agent, or Firm—Dressler, Goldsmith, Shore & Milnamow, Ltd.

[57] ABSTRACT

The present invention provides a filter element that comprises a center core and at least one layer of ion exchange yarn wound about the center core. In a preferred embodiment, more than one winding layer is wound about the core. The present invention also provides a method for purifying liquids, the method comprising providing a filter unit that contains a filter element that comprises a center core and at least one layer of ion exchange yarn wound about the core, and passing a liquid to be purified through the filter element.

14 Claims, 2 Drawing Sheets

FILTER ELEMENT HAVING AN ION EXCHANGE YARN WINDING LAYER

TECHNICAL FIELD

This invention relates to a filter element for use in a filter unit used to purify liquids containing dissolved solids and/or suspended particulate matter. In particular, this invention relates to a filter element having an ion exchange yarn winding layer over a foraminous center core, and a method of purifying liquids using such a filter element.

BACKGROUND OF THE INVENTION

Liquids can be filtered to remove undissolved particulate matter. In addition, dissolved solids can be removed from a liquid by sorption. The term "sorption" includes adsorption, whereby dissolved solids become associated with a surface of a material, called a sorbent; or absorption, whereby dissolved solids become localized within the body of the sorbent. For example, water may be filtered to remove particulates, such as sand, and dissolved minerals may be removed by sorption so that the water is suitable for drinking. In addition, the filtration and/or sorption of liquids plays a significant role in wastewater treatment and pharmaceutical production, among others. As used herein, the word "particulates" shall mean solid chemical compounds that remain undissolved in the liquid to be purified.

One way that particulates can be removed from a liquid is by filtration; that is, the liquid is passed through a filter and the opening or pores that are part of the filter's structure allow the liquid to pass through the filter, but do not allow the particulates to pass through. The size and the amount of particulates filtered from a liquid can be optimized by varying the openings or pore sizes of the filter.

On the other hand, dissolved solids usually pass through the openings or pores of a filter even when the openings or pores are very small. In polar liquids, such as water, many substances that dissolve end up as ions in solution. For example, an amount of sodium chloride (NaCl) dissolves in water at room temperature to form sodium ions, which are cations because they have a positive charge, and chlorine ions, which are anions because they have a negative charge. One way to remove such ions from solution is through the use of an ion exchange material.

Ion exchange is the reversible interchange of ions between a solid material and a liquid in which there is no permanent change in the structure of the solid material. Conventional ion exchange resins contain ion-active sites throughout their structure. A cation exchange resin has a negatively charged structure and exchanges cations. Conversely, an anion exchange resin has a positively charged structure and exchanges anions. When a liquid containing ions is passed through an ion exchange resin, the ions in the liquid are exchanged with the ions contained in the structure of the ion exchange resin. Thus, the ions that were in the liquid become ionically bonded to the ion exchange resin, and the ions that were originally present in the resin are liberated from the resin and become part of the liquid. Through ion exchange, certain ions can be removed from a liquid.

Before the present invention, filter elements were made by winding layers of fibers and/or yarn around a foraminous center core. The core was typically perforated to allow the liquid to flow in and out of the core. The fibers and/or yarn that was wrapped around the core to form winding layers did not possess ion exchange capability, but instead, were used to create openings or pores of various sizes for filtering suspended particulate matter. In addition, the winding layers also provided a substrate upon which finely divided particulate ion exchange resins could be deposited, and the winding layer the farthest from the core, the outermost layer, was usually precoated with the particulate ion exchange resin. Then, the liquid to be purified was passed through the ion exchange resin and the winding layers. Examples of such filter elements are disclosed in U.S. Pat. Nos. 4,414,113 and 4,269,707, which are assigned to the same assignee as the present invention.

To purify large volumes of liquids, the above-described filter element was typically part of a filter unit in which more than one filter element was used. Several drawbacks, however, are associated with the above-described ion exchange resin precoated filter elements. First, the presence of the particulate ion exchange resin precoated on the winding layers resulted in slower flow rates of the liquid through the filter elements. Also, if the flow is reversed through the filter to expel the particulate matter that has been filtered from the liquid to be purified, the particulate ion exchange resin is also expelled from the winding layers making it necessary to replace the ion exchange resin if the filter is to be used again. Moreover, the ion exchange precoat must be discarded after use, as it is not practical to regenerate. As a result, a large volume of waste is generated that must be discarded, which can be expensive.

The present invention, which relates to a filter element having a foraminous center core around which is wound at least one layer of yarn that has ion exchange capability, circumvents some of these problems. For example, it may not be necessary to apply a separate ion exchange resin if the winding layer itself has ion exchange capability. Therefore, there may not be a need to reapply the ion exchange resin upon reversal of flow to dislodge filtered particulates. Moreover, the step of precoating the filter element with particulate ion exchange resin may no longer be necessary. The present invention, therefore, provides for a quick and efficient way to make a filter element having both the ability to filter out particulates and having ion exchange capabilities. A preferred liquid to be purified is water.

In addition, filters having ion exchange capacity have been used as catalysts for chemical reactions. However, the kinetics of particulate ion exchange resins are limited. Greatly improved kinetics are, however, provided by the use of ion exchange fibers, which can be pan of an ion exchange yarn.

Another problem associated with the use of particulate ion exchange resins precoated on the winding layers of a filter element is channeling. As filtering of a liquid proceeds, the distribution of ion exchange particles in a precoat can shift causing channels to form in the precoat. Typically, the channels may contain little or no ion exchange resin. Thus, the liquid which passes through the channels is not effectively ion exchanged as desired.

SUMMARY OF THE INVENTION

The present invention provides a filter element for removing dissolved solids and suspended particulate matter from a liquid directed therethrough, the filter element comprises a foraminous center core and at least one layer of ion exchange yarn wound around the center core, the filter element having a nominal particle retention number selected to simultaneously remove suspended particulate matter and dissolved solids from a liquid directed therethrough.

Also provided is a method for removing dissolved solids and suspended particulate matter from a liquid, the method comprising providing a filter unit that contains a filter element that comprises a foraminous center core and at least one layer of ion exchange yarn wound about the center core, and passing a liquid through the filter element, the filter element simultaneously removing suspended particulate matter and dissolved solids from the liquid directed therethrough.

DETAILED DESCRIPTION OF THE INVENTION

The present invention provides a filter element that comprises a foraminous center core and at least one layer of ion exchange yarn wound about the center core. As used herein, the term "filter element" shall mean a part of a filtering system or filter unit. In general, the filter element of the present invention is the portion of the filter unit that filters out particulates and removes dissolved solids (i.e., ions) from the liquid to be purified. In contrast, the filter unit is a collection of one or more filter elements, which taken together form an apparatus for the filtering of liquids. A filter unit can include, for example, a storage vessel for the liquid to be filtered, means for transferring the liquid to the filter elements, means for controlling the flow of the liquid through the filter element, and means for collecting the filtrate. An example of a representative filter unit can be seen in U.S. Pat. No. 4,269,707, issued May 26, 1981, the disclosure of which is hereby incorporated by reference. It should be noted that the filter elements disclosed herein may be used in a large number of filter units known to those skilled in the art, and the filter unit described herein is an exemplary filter unit in which the filter elements of the present invention can be used.

Figure 1:
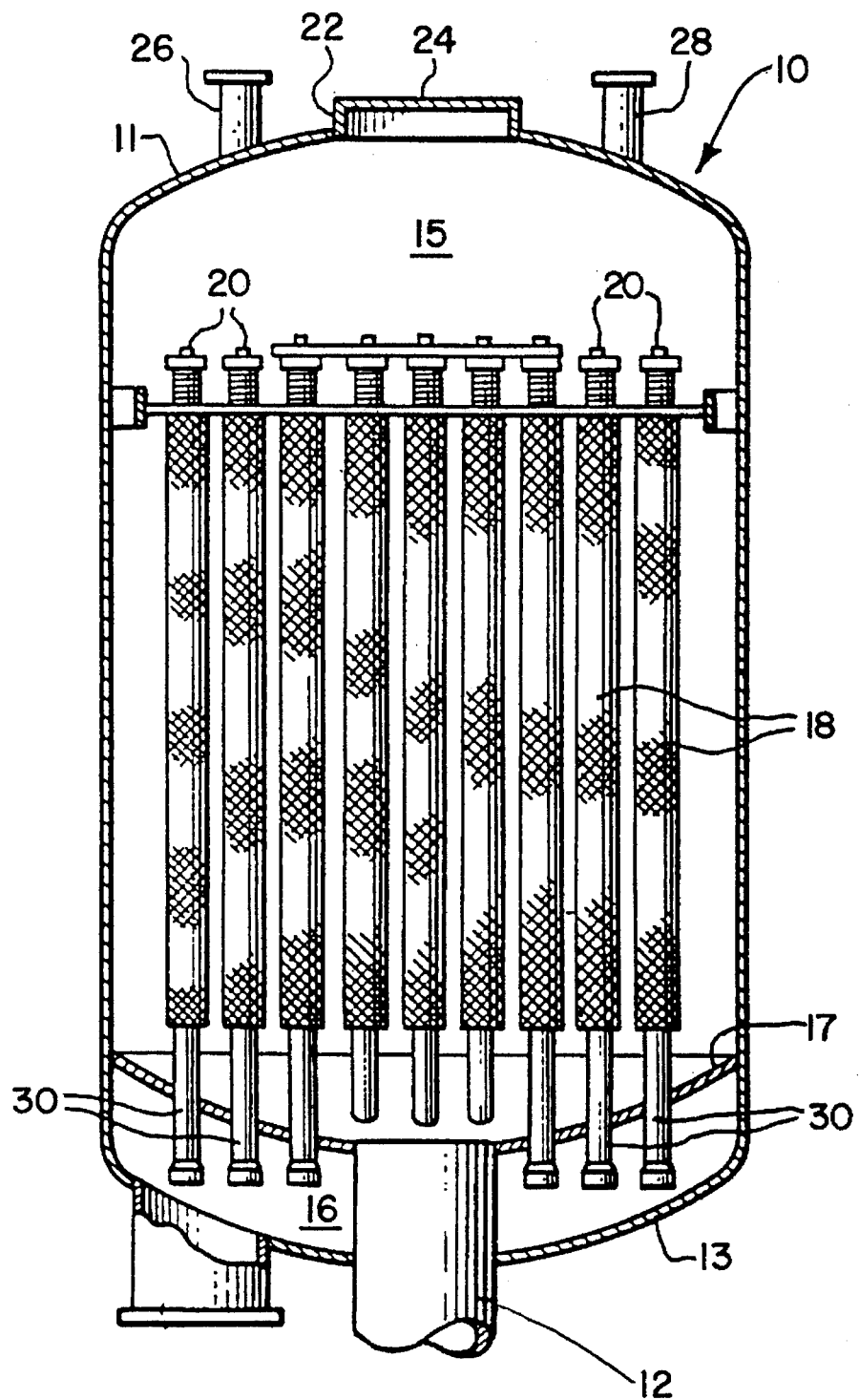
FIG. 1 is a partial cross-sectional view of an exemplary filter unit having replaceable filter elements constructed in accordance with the present invention.

FIG. 1 shows an exemplary filter unit which is adapted to receive an influent stream, filter the influent stream and discharge the filtrate or effluent stream. Such a filter unit is of the type which can be used in conjunction with the filter elements of the present invention.

The filter tank 10 is generally a cylindrical vessel made of steel or the like having an outwardly convex top 11 and an outwardly convex bottom 13. The tank 10 is divided into an influent zone 15 and a filtrate zone 16 by a downwardly curved tube sheet plate 17 suitably secured to the interior of the tank 10 by welding or the like. The influent line 12 extends through the bottom 13 of the tank and communicates with the influent zone 15 so that all of the influent liquid is passed directly to the influent zone 15. The influent pipe 12 is attached to the tube sheet plate 17 by welding or the like. In this manner, direct communication between the influent zone 15 and the filtrate zone 16 is precluded.

Mounted within the influent zone 15 are a plurality of filter elements 18, constructed in accordance with the present invention, through which the influent stream must pass before entering the filtrate zone 16 and being discharged from the filter tank 10 through the outlet line 14. The filter elements 18 are wound filter elements having a foraminous core and an ion exchange yarn winding layer around the core in accordance with the present invention. Each filter element 18 is held in place in the influent zone 15 of the filter tank 10 by a holding assembly indicated generally by the reference number 20. This holding assembly is adapted to releasably hold the filter elements 18 in place upon a filter seat means 30 which are attached to the tube sheet plate 17. The filter elements 18 are placed into and removed from the filter tank 10 through a small manhole opening 22 in the filter tank 10. The manhole opening 22 has a cover means 24 which may be removed or opened as desired, to provide access to the interior of the filter tank 10.

The filter tank 10 is also provided with a vent 26 and a spare nozzle 28, which in this instance is capped. The vent 26 may be of any suitable construction, the selection of appropriate vent means being dependent generally upon the use of the filter tank and being within the ordinary skill of one in the art.

The filter seat means 30 comprises a small pipe made of steel or the like, which extends through a hole in the tube sheet plate 17 and is attached to the tube sheet plate 17 by welding or other suitable means. The filter seat means 30 is substantially parallel to the longitudinal axis of the filter tank 10 and provides communication between the influent zone 15 with the filtrate zone 16. The filter seat means 30 provides a base for the filter elements 18, which is held in position on the seat means 30 by the holding assembly 20. The filter elements 18 are typically fifty to eighty inches in length and one to three inches in outside diameter and may consist of a unitary element or several cartridges, usually ten inches in length, which are combined to form a single element.

The liquid to be purified is introduced into the filter unit through influent pipe 12 into influent zone 15 and is then passed through the filter elements 18 and collected in filtrate zone 16.

Figure 2:
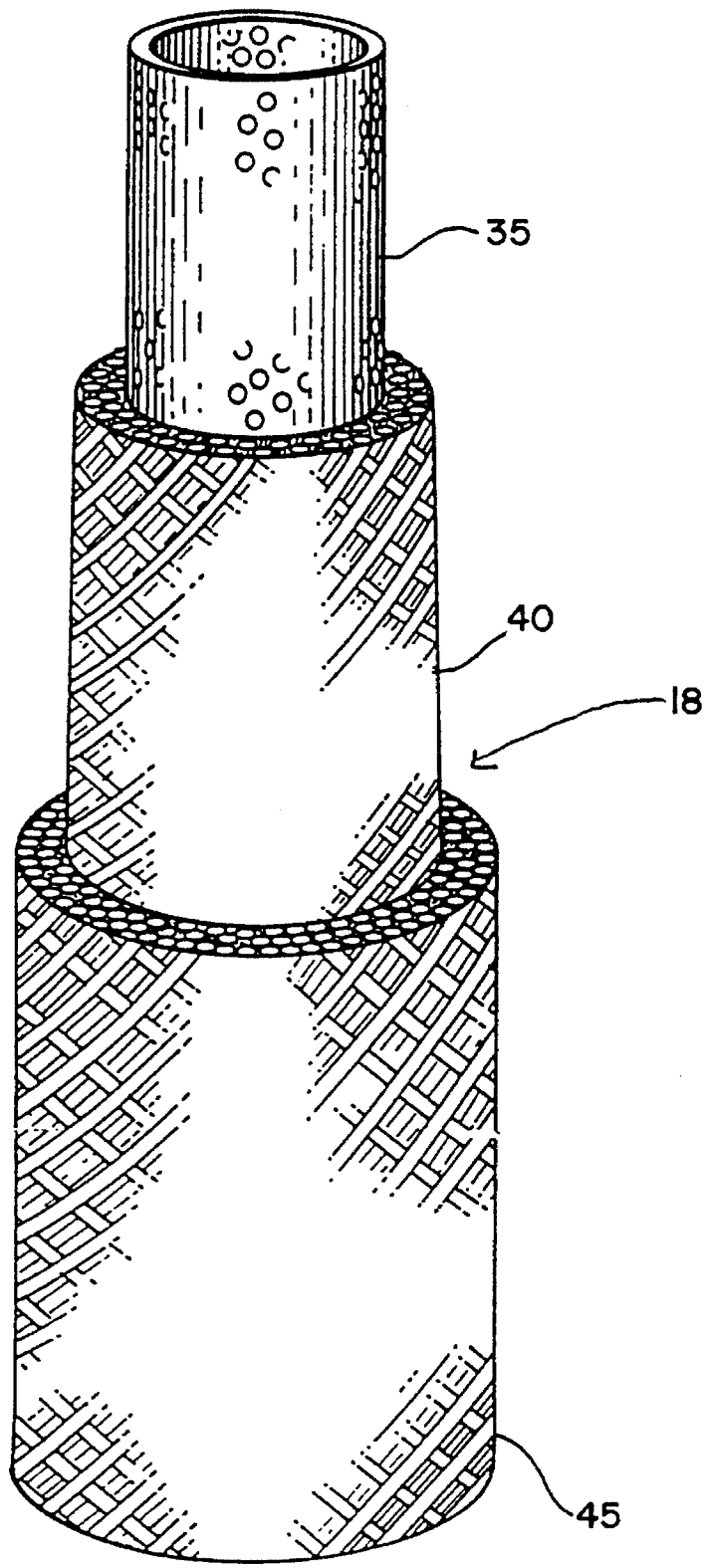
FIG. 2 is a perspective view of a filter element according to the present invention, partially cut away to show the winding layers about the foraminous center core.

FIG. 2 shows a filter element 18 constructed in accordance with the present invention. The filter element comprises a foraminous center core 35 which has been perforated to allow for the flow of the liquid to be purified to and from the center core as desired. For example, the liquid flows through a winding layer (as discussed below) and through the core during filtration and through the core and the winding layer during regeneration of the filter and when expelling particulates from the filter. The core may be perforated as desired. For example, FIG. 2 shows circular perforations; however, the size and shape of the perforations may vary in accordance with the desired flow characteristics of the filter element. Those skilled in the art are familiar with the various sizes and shapes of perforations. In addition, the core can be any shape. For example, the core can be cylindrical as shown in FIG. 2, or the core may be square or rectangular or some other geometric configuration known to those skilled in the art.

The center core may be made from any material which does not detrimentally interact with the liquid to be filtered, the winding layers or the materials to be removed from the liquid. Also, the core should provide a rigid support upon which the winding layers can be wound. Moreover, the core should be able to withstand any pressure under which filtration is to be done. Preferably, the center core is constructed of stainless steel and has a plurality of symmetrically spaced apertures to produce approximately twenty percent open area. In general, the perforations or apertures in the core are about 5% to about 60% of the surface area of the core. Preferably, the inside diameter of the core is between about ¾ inch and about 1 and ⅜ inch.

The filter elements 18 of the present invention also have a layer of ion exchange yarn 40 wound about the core, i.e., a winding layer that has ion exchange capabilities. The ion exchange yarn winding layer of the present invention may be any ion exchange yarn that is known to those skilled in the art, including cationic ion exchange yarns, which have the ability to exchange cations, and anion exchange yarns, which have the ability to exchange anions. As used herein the term "yarn" shall mean a continuous strand, often of two or more plies, that is composed of fibers twisted together by spinning or laid parallel. It is contemplated that the cation exchange yarns may include ion exchange materials based on strong and weak acids and the anion exchange yarns may include ion exchange materials based on strong and weak bases.

As used herein, the term "layer" refers to windings of strand material or yarn sufficient to produce a desired "nominal particle retention number" uniformly along a filter element. Thus, a layer may include many overlapped strands or yarns, depending on the winding pattern employed. Moreover, one layer overlying another may not have any visible discrete separation from the underlying layer, having the same nominal particle retention number. As used herein the "nominal particle retention number" of a layer is the longest dimension of the smallest regularly shaped particle whose percent removal by the filter element layer is 90 or greater. An exemplary method of determining the "nominal particle retention number" of a filter element is described in U.S. Pat. No. 4,269,707, the disclosure of which is hereby incorporated by reference.

The number of passes of the winding along the center core and the incremental lead settings for the winding units are determined by the desired particle retention ability.

If layers are included in the filter element 18 in addition to an inner and an outer layer, each of the layers in addition to the inner layer can have a nominal particle retention number less than an adjacent inner layer. In this manner, the filter element is provided with a plurality of layers having nominal particle retention numbers which decrease from the innermost layer to the outermost layer. However, the layers can have the same nominal particle retention number or any combination of different nominal particle retention numbers.

For example, in water filtration units which reduce impurities in water from about 50 parts per billion to about 10 parts per billion, the outermost layer has a nominal particle retention number in the range of about one to about twenty-five microns, and an innermost layer has a nominal particle retention number between about twenty-five and about one hundred microns.

Typically, ion exchange yarns can be made by manufacturing ion exchange fibers followed by the spinning of the fibers into yarn. Ion exchange yarns can also made by producing a yarn from an ion exchange precursor polymer, followed by functionalization of the finished yarn to provide ion exchange capabilities. In other words, a yarn is made and then the yarn is chemically modified to provide for ion exchange capabilities. The manufacture of ion exchange fibers is well known to those skilled in the art. See, for example, M. Lewin e t al., "High Technology Fibers" Part B, *Handbook of Fiber Science and Technology*, Volume III, Marcel Dekker, Inc., New York, 1989; G. A, Richter et al., U.S. Pat. No. 3,055,729, issued Sep. 25, 1962; and G. A. Richter et al., U.S. Pat. No. 2,933,460, issued Apr. 19, 1960, which are hereby incorporated by reference.

Ion exchange fibers are commercially available. Examples of suitable ion exchange fibers include, but are not limited to, strong cation based fibers sold under the tradename Toray from Toray of Japan; strong acid (IEF-SC) and strong base based fibers sold under the Nitivy tradename from Nitivy of Japan; and fibers sold under the Fiban tradename from Fiban of Minsk, Belarus, such as Fiban K-1 (strong base), Fiban A-1 (weak acid), Fiban K-4 (weak base), and Fiban AK-22, which has both anion and cation exchange capabilities.

The filter elements of the present invention can have one ion exchange yarn layer in which one type of ion exchange yarn is wound around the core. In another embodiment of the invention, the core may be wound with more than one type of ion exchange yarn. For example, the core can be wound with two ion exchange yarns with both being cation exchange yarns or anion exchange yarns or one being an anion exchange yarn and one being a cation exchange yarn. It is contemplated that many other combinations of two or more ion exchange yarns could be used to make a filter element.

It is also contemplated that when more than one ion exchange yarn is wound around the core that the ion exchange yarns can be separately layered. For example, FIG. 2 shows a filter element having two layers of ion exchange windings. The first winding layer 40 is adjacent to the core. The second winding layer 45 is wound over the first winding. A plurality of winding layers can be applied in the manner shown, one after another. Alternatively, a layer can comprise more than one ion exchange yarn. For example, a layer may comprise a cation exchange yarn and an anion exchange yarn.

In addition to the winding layers having ion exchange capabilities, other winding layers may be wound around the core in addition to an ion exchange yarn winding layer. For example, a winding layer can comprise nylon, orlon, polypropylene, cotton or other synthetic or natural materials. Such winding layers may be yarns or other strand material. In addition, a winding layer may have functional groups that provide for chelation of various compounds or atoms. It should be noted that the filter element of the present invention has at least one winding layer that is an ion exchange yarn.

It is also recognized that the topology of the yarn winding layers may be varied to provide for different openings or pore sizes. If more than one winding layer is used in a filter element, the different winding layers can have different winding topologies, and thus, different pore sizes. For example, in a filter element having two winding layers, the inner winding layer, the winding layer adjacent to the core, may be "looser" than the outer winding layer. Such variations of winding layer topology are known to those skilled in the art. In a preferred embodiment having two winding layers of different topologies, the size range of the particles retained by the outer winding layer is in the range of about one to about twenty-five microns and the size range of the particles retained by the inner winding layer is in the range of about twenty-five to about one hundred microns. In one embodiment of the invention, the yarns are spirally wound in a helical fashion, and the spacing between adjacent strands of yarn is about 1/16 inch or less, which produces less than about a one percent open area; however, other winding patterns and spacings known to those skilled in the art can be used.

The particle retention ability of each winding layer is dependent upon several additional factors in addition to yarn strand spacing. The particle retention ability may be varied, for example, by varying the tension under which the yarn is wound, the thickness of each layer of yarn or by changing the pattern which is formed as the yarn is wound back and forth. In addition, the size of the yarn to be wound around the core can also be varied. Variation of the size of the yarn can also be used to provide different openings or pore sizes.

In another embodiment of the invention, a finely divided particulate ion exchange resin may be precoated on the outer winding layer. This precoat layer is in addition to the ion exchange yarn winding layer. The application of such particulate ion exchange resins to a winding layer that is not an ion exchange yarn is well known to those skilled in the art. In an embodiment of the invention which uses a particulate ion exchange resin and an ion exchange yarn winding layer, the ion exchange yarn may be a cation exchange yarn and the ion exchange resin may be an anion exchange resin or vice-versa. Alternatively, the ion exchange yarn may be either a cation or an anion exchange yarn and the ion exchange resin the same (i.e. cation-cation or anion-anion). In another embodiment of the invention, the filter element comprises a cation exchange yarn, an anion exchange yarn, and a precoat that comprises both cation and anion exchange resins.

Typical particulate cation exchange resins that can be used in the present invention include, but are not limited to the divinylbenzene-styrene copolymer type, the acrylic type, the sulfonated coal type and the phenolic type. These can be used in sodium, hydrogen or ammonium form, for example. Anion exchange resin particles that can be used in the present invention include, but are not limited to, the phenol formaldehyde type, the divinylbenzene-styrene copolymer type, the acrylic type and the epoxy type. The anion exchange resins can be used in the hydroxide or chloride forms, for example. Suitable resins are sold commercially in the large bead form. The finely divided resins are prepared by reducing the particle size of these well known large bead resins to the desired range, which are regenerated and washed prior to use. In general the particles have a size in the range of about 60 to about 400 mesh. Examples of commercially available ion exchange resins that may be used in the present invention include but are not limited to, the Powdex® family of powdered ion exchange resins, the Ecodex® family of powdered ion exchange resin precoats, the Ecocote® family of microfibers, and the Gravex® family of ion exchange bead resins, all of which may be obtained from the Graver Chemical Company of Glasgow, DE.

Also provided by the present invention is a method for purifying liquids comprising the steps of (a) providing a filter unit that contains a filter element that comprises a core and an ion exchange yarn layer wound about the core, and (b) passing a liquid to be purified through the filter element.

In general, the liquid to be purified is introduced into the filter element. With reference to FIG. 2, the influent is introduced through the winding layers 40 and 45 and into the core 35. As the liquid passes through the winding layers, particulate matter is filtered out. In addition, as the liquid passes through the ion exchange yarn winding layer, ions are removed by exchange with other ions, which are released into the liquid. As the purification process proceeds, the particulate solids that are filtered from the liquid fill up the openings or pores of the windings and there is a pressure drop or reduction of liquid flow. When this reaches a predetermined level, the filter may be regenerated by backwashing the filter elements; that is, reversing the flow of the liquid from the core to the windings. In addition, the ion exchange capacity of the ion exchange winding may be regenerated by directing an appropriate ion containing regenerant solution through the winding layers as is well known to those skilled in the art.

Many modification and refinements which do not depart from the true spirit and scope of the invention may be conceived by those skilled in the art. It is intended that all such modifications be covered by the following claims.

What is claimed is:

1. A filter element for removing dissolved solids from a liquid, the filter element comprising:
   a) a foraminous center core;
   b) at least one layer of ion exchange yarn wound around the center core, wherein the filter element provides for the removal of dissolved solids from a liquid directed therethrough; and
   c) said filter element being precoated with a particulate ion exchange resin.

2. A filter element according to claim 1 wherein the particulate ion exchange resin has a particle size in the range of about 60 to about 400 mesh.

3. A filter element according to claim 1 wherein the filter element is precoated with a chelating resin.

4. A filter element according to claim 1 wherein more than one layer of ion exchange yarn is wound about the center core.

5. A filter element according to claim 2 wherein at least one layer of ion exchange yarn is a cation exchange yarn and at least one layer of ion exchange yarn is an anion exchange yarn.

6. A filter element according to claim 1 wherein at least one layer of ion exchange yarn has a nominal particle retention number in the range of about one to about twenty-five microns.

7. A filter element according to claim 1 wherein at least one layer of ion exchange yarn has a nominal particle retention number in the range of about twenty-five to about one hundred microns.

8. A method for removing dissolved solids from a liquid, the method comprising:
   a) providing a filter unit that contains a filter element that comprises a foraminous center core and at least one layer of ion exchange yarn wound about the center core;
   b) passing a liquid through the filter element, the filter element removing dissolved solids from the liquid directed therethrough; and
   c) precoating the filter element with a particulate ion exchange resin.

9. The method according to claim 8 wherein the particulate ion exchange resin has a particle size in the range of about 60 to about 400 mesh.

10. The method according to claim 8 wherein the filter element is precoated with a chelating resin.

11. The method according to claim 8 wherein more than one layer of ion exchange yarn is wound about the center core.

12. The method according to claim 11 wherein at least one layer of ion exchange yarn is a cation exchange yarn and at least one layer of ion exchange yarn is an anion exchange yarn.

13. The method according to claim 8 wherein at least one layer of ion exchange yarn has a nominal particle retention number in the range of about one to about twenty-five microns.

14. The method according to claim 8 wherein at least one layer of ion exchange yarn has a nominal particle retention number in the range of about twenty-five to about one hundred microns.

* * * * *